June 2, 1959 H. J. MODREY 2,889,050

KEY FILE DEVICE

Filed Sept. 19, 1957 2 Sheets-Sheet 1

INVENTOR.
HENRY J. MODREY

BY Hane and Nydick

ATTORNEYS

June 2, 1959 H. J. MODREY 2,889,050

KEY FILE DEVICE

Filed Sept. 19, 1957 2 Sheets-Sheet 2

INVENTOR.
HENRY J. MODREY

BY Harness and Nydick

ATTORNEYS 2,889,050

KEY FILE DEVICE

Henry J. Modrey, Stamford, Conn.

Application September 19, 1957, Serial No. 684,906

14 Claims. (Cl. 211—4)

This invention relates to a device for supporting keys and, more particularly, to a device for supporting a plurality of keys and corresponding spare keys in a convenient and efficient manner.

In many types of offices, plants and institutions, keys play an important part in the normal procedures of the organization and can thus unduly delay activities when they are misplaced, lost or mixed up. Spare or duplicate keys are habitually furnished with every lock and must likewise be kept in easily accessible order. Ordinarily, duplicate or spare keys are individually tagged or labeled and are kept separately from the key boards in use so that they are difficult to locate when needed.

Accordingly, it is an object of the present invention to provide a key support and storage device that is simple in construction, efficient in operation, and which will overcome the aforementioned difficulties.

Another object of the present invention is to provide a combined original key support and spare key support unit of the above type having special provisions for filing receipts issued for the withdrawal of spare keys, which receipts are safely retained within the housing of the unit so as to constitute a very simple and highly effective key filing system.

Still another object of the present invention is to provide a keyboard having key support hooks for receiving predetermined keys, and associated locking means for such hooks.

Yet another object of the present invention is to provide a locking keyboard having self-contained spare key support brackets for supporting spare keys or key issue receipts in predetermined spaced relationship orientated with respect to the original keys carried by the keyboard.

A further object of the present invention is to provide a keyboard which supports original and spare keys in predetermined orientated relative positions, each key being independently accessible, and has locking means for controlling access to the keys.

A more specific object of the present invention is to provide a key file device in the form of a compartment having a detachable front cover behind which spare keys are supported, removal of the front cover providing access to the spare keys, rotatable supports extending through the front cover for carrying individual keys in a predetermined orientated relationship relative to the spare keys or key issue receipts within the device, and associated operating and locking means for simultaneously preventing the removal of keys carried by said individual key supports and preventing removal of the front cover to preclude access to the spare keys carried therewithin.

Still a further object of the present invention is to provide a unitary keyboard that may be used in combination with a plurality of similar keyboards for larger installations in which the operating elements of certain ones of the units may be integrally connected together for unitary operation so that all of the keys in the associated units can be simultaneously locked in a single operation while still other ones of the associated units may be individually locked and operated to comply with security regulations in force in various types of plants.

All of the foregoing and still further objects and advantages of this invention will become apparent from a study of the following specification, taken in connection with the accompanying drawing, in which.

In accordance with the present invention, a key file device has been provided that includes a main base wall and a removable closure wall which define a closed compartment therebetween. One of the walls is provided with longitudinally spaced original key supports, while brackets extend into the compartment between the walls for supporting reserve keys in predetermined orientated positions relative to the original key support means thereof. Thus, the original and the spare keys as well as the key receipts are maintained in a predetermined spaced relationship at all times, access to the spare keys and receipts being had by removing one front closure wall whenever required.

Figures 1, 2, 3, 4, 5:
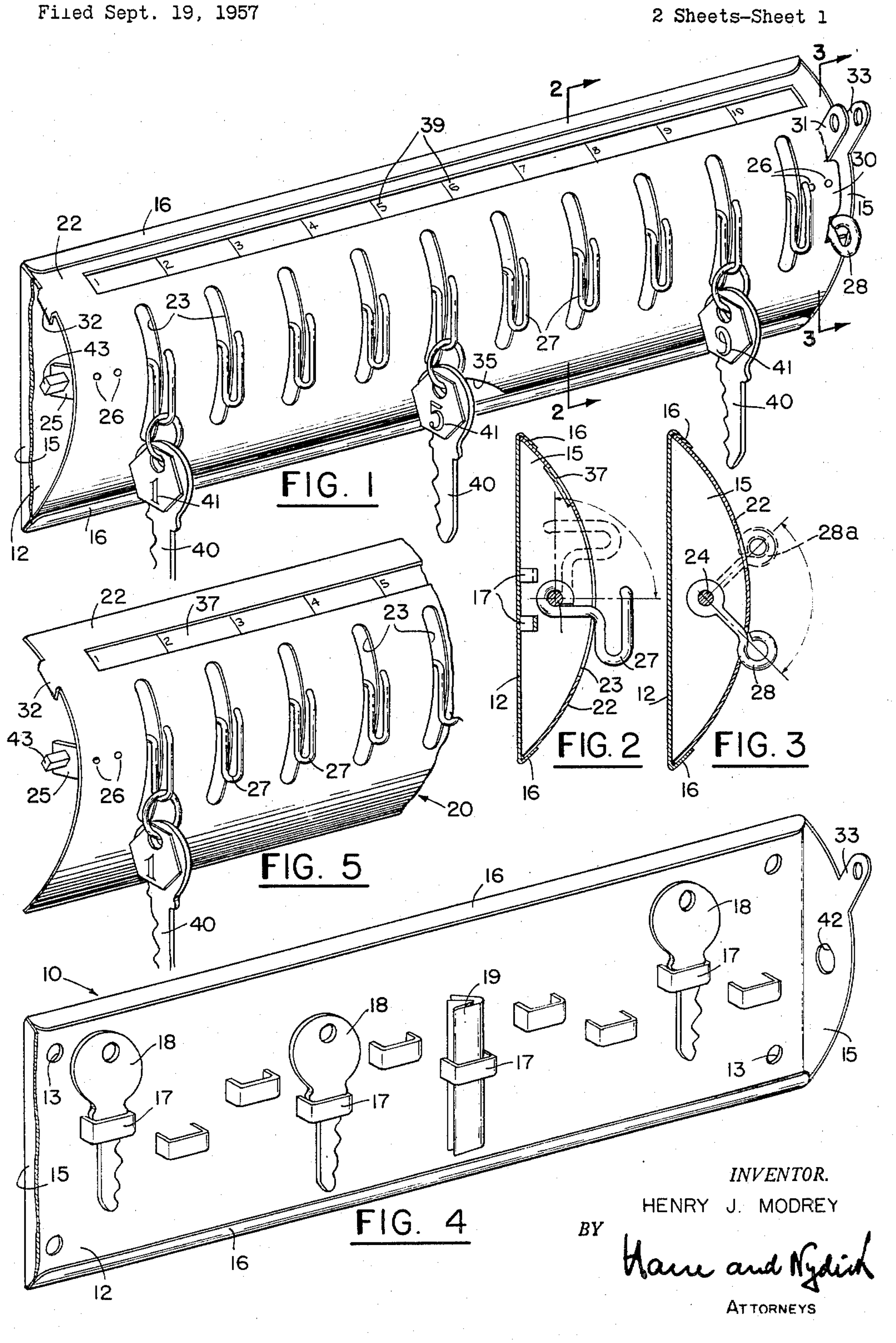
Figure 1 is a perspective view, with parts broken away, of a key file device made in accordance with one form of the present invention, in operative use.
Figure 2 is a transverse cross-sectional view taken along line 2—2 of Figure 1.
Figure 3 is a transverse cross-sectional view taken along line 3—3 of Figure 1.
Figure 4 is a fragmentary perspective view of the base wall of the keyboard shown in Figure 1.
Figure 5 is a fragmentary perspective view of certain other parts of the device shown in Figure 1.

Referring now more in detail to the drawing, and more particularly to Figures 1 and 5 thereof, a key file unit made in accordance with a preferred form of the present invention, is shown to include a base member 10 having a substantially flat base wall 12 that is provided with mounting holes 13 for securing the base to any desired stationary member. Each end of the base wall 12 is provided with a perpendicularly outwardly extending arcuate side wall 15, while the lateral sides thereof are provided with forwardly converging edge flanges 16 for releasably engaging with the corresponding lateral edges of the removable closure member 20 that is of substantially arcuate cross-sectional configuration. The closure member 20 and base member 10 define a centrally located compartment into which spare key or receipt support brackets 17 that are secured to the base wall 12 extend. Each of these brackets 17 is adapted removably to receive a spare key 18 or a receipt 19 that evidences the removal of one of the spare keys.

In actual use, the closure member 20 prevents access to the spare keys, but can be selectively removed by bowing or bending the closure wall 22 inwardly by exerting pressure upon the cut-out 35 to disengage the securement edge flanges 16 of the base wall 12. This closure wall 22 is also provided with laterally extending and longitudinally spaced apart slots 23 which are in substantial alignment with the respective ones of the spare key support brackets 17. Original key support hooks 27 having spaced legs and a bight portion extend into these slots 23 and are secured to a common shaft 24 at their inner ends. The shaft is rotatably mounted upon shaft support brackets 25 connected to the front closure wall 22, such as by rivets 26. One extremity of the shaft is provided with an operating handle 28 which is movable between two extreme positions determined by a slot defined by a stop member 30. The handle 28 is sprung inwardly so as frictionally to engage the closure wall 22 and thus snap into each of the opposed positions to assure the proper positioning of the parts. As is clearly shown in Fig. 1, the handle 28 is provided with an aperture which is adapted to become aligned with similar apertures in a lock tab 31 carried by the closure wall 22 and the lock tab 33 carried by the end wall 15 of the base member when the handle is rotated to the lock position 28a as indicated in Fig. 3. The opposite end of the closure wall 22 is provided with a positioning lip 32 that overlies the adjacent end wall 15 of the base member when the parts are in the assembled position. Thus, any suitable lock 34 may be used to secure the operating handle in the locked position, in which position the hooks 27 are in the rotated locked position 27a. In this position the tips of the hooks protrude into the slots thereby precluding a removal of the keys 40 from the hooks and the keys also cooperate therewith to block the unauthorized removal of the closure member 20.

The upper edge of the closure member wall 22 is provided with a key index tab 37 upon which indicia 39 are imprinted to facilitate the location of each of the keys. Corresponding indicia 41 on hang tabs carried by the key ring further facilitate the proper positioning of the keys. As the index tab 37 designates the location of the keys in the spare key brackets 17 as well as the key supported on the hooks 27, the proper replacement key 18 can be readily located by removing the cover plate 22 and placing the index strip 37 in proximity with the spare keys so that the proper one can be readily located. Thus a single index strip 37 serves to locate the original keys and the spare keys in a very efficient manner.

Figure 7:
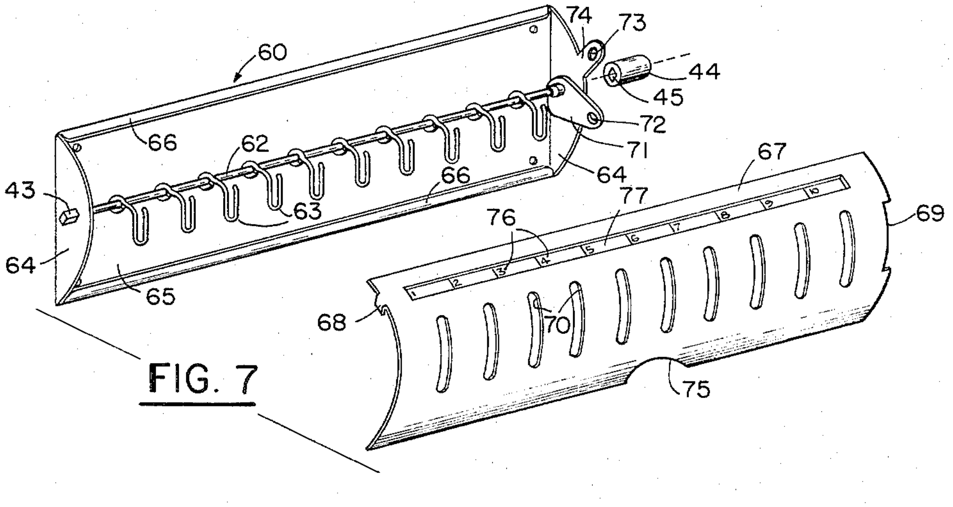
Figure 7 is an exploded perspective view illustrating a modified form of the present invention.

A coupling member 44 having a non-circular bore 45 as shown in Fig. 7 may be attached to the non-circular end 43 of the operating shaft 24 which extends outward through the sides of the base member through holes 42 provided for that purpose.

Figure 6:
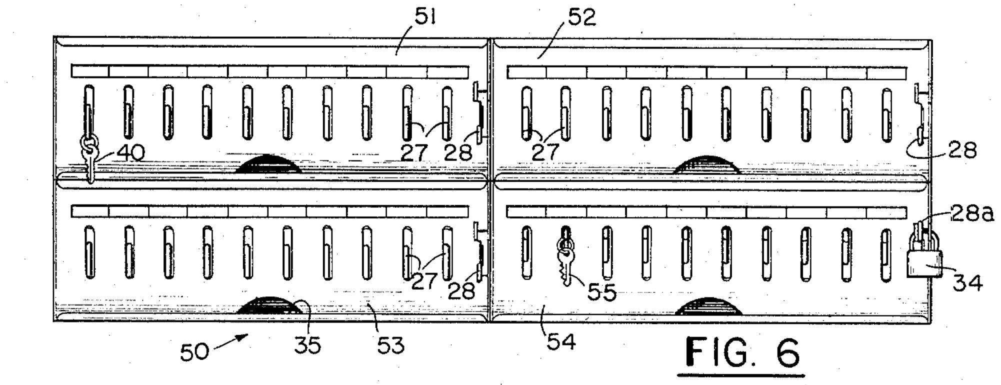
Figure 6 is a front elevational view of a plurality of separate units arranged together in bank, certain ones being connected for simultaneous operations and other ones being independently actuated.

Any selected number of units as shown in Fig. 1 may be connected by means of such coupling members. Fig. 6 shows a bank of four key files made in accordance with the present invention. The upper files 51, 52 are coupled together in this manner so that actuation of one of the operating handles 28 is operative to effect movement of all the supported hooks 27 between a normal open and an adjusted closed position. The lower units 53, 54 are not connected for simultaneous operation as indicated by the different positions of handles 28, so that one of the units may be locked independently of the other unit. An arrangement of this type is particularly useful in plants having rigid security requirements in which certain keys 55 giving access to restricted areas may be kept constantly under lock and key by a separate lock 34 which holds the operating handle in the locked position 28a.

Referring now to Fig. 7 of the drawing, a modified form of construction is shown wherein the base member 60 is devoid of spare key supporting elements and is provided with a longitudinal operating shaft 62 that is rotatably mounted upon the end walls 64. This shaft 62 operatively supports key hooks 63 in a manner similar to that hereinbefore described, which hooks extend through aligned slots 70 in the front closure wall 67. This wall 67 is supported in assembled relationship with the base wall 65 by means of the longitudinal flanges 66. A finger cutout 75 in the front closure wall 67 is provided to facilitate the removal of the front wall from the base wall. One end of this front wall is provided with a positioning lip 68 that overlies one of the end walls 64 of the base, while the opposite end is provided with a recess 69 for guiding the movement of the operating handle 71 between an open and a closed position. This handle 71 is provided with an aperture 72 which is arranged to align with an aperture 73 in a tab 74 integral with the adjacent end wall 64 of the base member so as to provide means for locking the parts in the closed position. An index strip 77 having suitable indicia 76 is provided to facilitate the location of the keys supported upon the hooks 63 as hereinbefore described.

Figure 8:
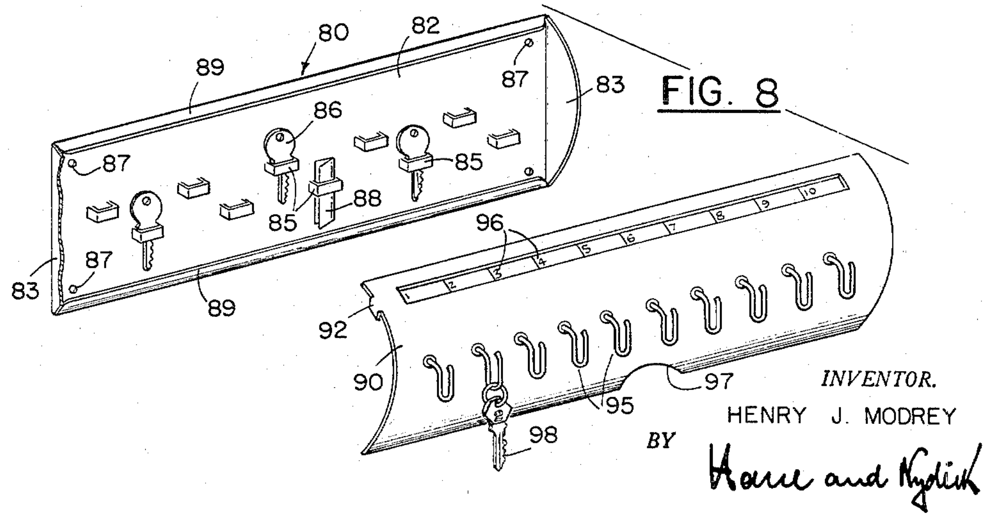
Figure 8 is an exploded perspective view of a still further modified form of construction.

Referring now to Figure 8 of the drawing, a still further modified form of construction is shown wherein the base member 80 is provided with a base wall 82 and end walls 83. Spare key brackets 85 are arranged in staggered longitudinally spaced relationship upon the base wall 82 for supporting spare keys 86 and key issue receipts 88. Longitudinal edge flanges 89 removably secure the front closure wall 90 in assembly with the base wall so as to provide access to the interior thereof when required. This closure wall 90 is provided with a positioning lip 92 and a finger cutout 97 to facilitate the proper positioning and assembly of the unit. Rigidly mounted hooks 95 secured to the front side of the closure wall 90 provide a sturdy support for the keys 98 that may be suspended thereon and readily located by means of the indicia 96 on the associated index strip as hereinbefore explained.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. A device for supporting keys comprising, in combination, a base wall, a spaced closure wall removably carried by said base wall defining a compartment therebetween, means for releasably securing said walls together, a plurality of individual key support members extending outwardly from said closure wall, and spare key support means mounted on the base wall within said compartment for supporting spare keys and receipts for removed spare keys, said spare key support means being each in substantial alignment with a respective one of said key support members.

2. A device for supporting keys as set forth in claim 1, wherein said individual key support members are disposed in longitudinally spaced apart relationship.

3. A device for supporting keys as set forth in claim 1, wherein said spare key support means comprises a plurality of brackets in longitudinally spaced apart relationship, each of said brackets being in substantial alignment with each respective one of said key support members.

4. A device for supporting keys as set forth in claim 3, wherein said individual key supports are fixedly mounted upon said closure wall, and further comprising indicia means carried by said device for indicating the position of diverse keys carried by said individual key support and said spare key supports.

5. A device for supporting keys comprising in combination, a base wall, a spaced closure wall removably carried by said base wall defining a compartment therebetween, means for releasably securing said walls together, a plurality of individual key support members extending outwardly from said closure wall, and a longitudinal shaft supported for rotation about its longitudinal axis upon one of said walls, said closure wall defining a plurality of longitudinally spaced apart and laterally extending slots, said individual key support members being secured to said shaft for rotation therewith and each one thereof extending through one of said slots in said closure wall.

6. A device for supporting keys as set forth in claim 5, wherein each of said individual key support members comprises a hook, each one of said hooks having a pair of spaced legs, one of said legs of each hook being secured to said shaft and extending outwardly through said respective slot member, the other one of said legs normally being spaced outwardly from said closure wall and defining an upwardly opening bight portion, said other one of said legs in response to a rotation of said shaft from a normal to an adjusted position being rotatable into said respective slot to close said bight portion.

7. A device for supporting keys as set forth in claim 5, further comprising rotating means for selectively effecting said rotation of said shaft, and means for locking said shaft in said adjusted position.

8. A device for supporting keys as set forth in claim 5, further comprising indicia means carried by said device for indicating the positions of diverse keys carried by each of said individual key supports.

9. A device for supporting keys as set forth in claim 8, wherein said rotating means comprises an apertured operating handle secured to said shaft, and said locking means comprises an apertured tab fixedly carried by said base wall, and an opening through said handle, said tab aperture and said handle aperture being movable into register one with the other for receiving the bail of a lock.

10. A device for supporting keys as set forth in claim 9, further comprising coupling means for coupling the shaft of one device to the shaft of another device for effecting joint rotation of the shafts in response to actuation of said handle, said coupling means including a coupling member fittable upon the adjacent shaft ends of two devices to be coupled.

11. A device for supporting keys as set forth in claim 9, wherein said shaft is rotatably supported upon said base wall.

12. A device for supporting keys as set forth in claim 9, wherein said shaft is rotatably supported upon said closure wall.

13. A device for supporting keys as set forth in claim 5, further comprising spare key support brackets carried by said base wall in longitudinally spaced apart relationship, each of said spare key support brackets being orientated with respect to the position of said individual key support member.

14. A device for supporting keys as set forth in claim 6 and further comprising rotating means in the form of an apertured handle secured to said shaft, and locking means for locking said shaft in a predetermined rotational position, said locking means including an apertured tab carried by said closure wall in alignment and an apertured tab carried by said base wall, said apertured tabs and handle aperture being in registry in said predetermined shaft position to receive the bail of a lock for preventing relative rotation therebetween.

References Cited in the file of this patent

UNITED STATES PATENTS 770,756 Hynek ---------------- Sept. 27, 1904